United States Patent
Listerud et al.

(10) Patent No.: US 11,652,251 B2
(45) Date of Patent: May 16, 2023

(54) BATTERY STATE INDICATOR BASED ON RECOMBINATION DEVICE FEEDBACK

(71) Applicant: ZAF ENERGY SYSTEMS, INCORPORATED, Bozeman, MT (US)

(72) Inventors: Eivind Listerud, Osceola, MO (US); Adam Weisenstein, Bozeman, MT (US); Melissa D. McIntyre, Butte, MT (US); Allen Charkey, Winter Haven, FL (US); Michael J. Gordon, Joplin, MO (US); Shiloh J. Williams, Joplin, MO (US)

(73) Assignee: ZAF Energy Systems, Incorporated, Bozeman, MT (US)

( * ) Notice: Subject to any disclaimer, the term of this patent is extended or adjusted under 35 U.S.C. 154(b) by 57 days.

(21) Appl. No.: 17/087,161

(22) Filed: Nov. 2, 2020

(65) Prior Publication Data

US 2022/0140419 A1    May 5, 2022

(51) Int. Cl.
*H01M 10/6595*  (2014.01)
*H01M 10/48*    (2006.01)
*H01M 10/44*    (2006.01)

(52) U.S. Cl.
CPC ..... *H01M 10/6595* (2015.04); *H01M 10/443* (2013.01); *H01M 10/48* (2013.01)

(58) Field of Classification Search
CPC .. H01M 10/523; H01M 10/526; H01M 10/52; H01M 2300/0002; H01M 4/521; H01M 6/04

See application file for complete search history.

(56) References Cited

U.S. PATENT DOCUMENTS

| | | | |
|---|---|---|---|
| 3,470,024 A | | 9/1969 | George et al. |
| 3,630,778 A | | 12/1971 | Kreidl et al. |
| 3,817,717 A | | 6/1974 | Kreidl et al. |
| 3,976,502 A | * | 8/1976 | Sekido .......... H01M 50/40 429/59 |
| 4,048,387 A | | 9/1977 | Lahme et al. |
| 4,247,811 A | * | 1/1981 | Findl .......... H02J 7/0088 320/134 |

(Continued)

FOREIGN PATENT DOCUMENTS

| | | |
|---|---|---|
| DE | 2346115 A1 | 4/1975 |
| DE | 3241879 A1 | 5/1984 |

(Continued)

OTHER PUBLICATIONS

International Search Report and Written Opinion of the International Searching Authority for International Application No. PCT/US2021/057557, dated Jan. 27, 2022, 8 pgs.

*Primary Examiner* — Brian R Ohara
*Assistant Examiner* — Patrick Marshall Greene
(74) *Attorney, Agent, or Firm* — Brooks Kushman P.C.

(57) ABSTRACT

An aqueous battery system includes an electrode assembly, a recombination device, and a controller. The recombination device has a catalyst that combines hydrogen and oxygen produced by the electrode assembly to form water and generate heat via exothermic reaction. The controller, responsive to a detected temperature or change in temperature associated with the recombination device due to the heat, changes power supplied to the electrode assembly.

16 Claims, 3 Drawing Sheets

(56) References Cited

U.S. PATENT DOCUMENTS

| | | | |
|---|---|---|---|
| 4,810,598 A * | 3/1989 | Levy | H01M 10/52 |
| | | | 429/59 |
| 6,878,481 B2 | 4/2005 | Bushong et al. | |
| 7,372,237 B2 | 5/2008 | Bushong et al. | |
| 2005/0058892 A1 * | 3/2005 | Ovshinsky | H01M 10/652 |
| | | | 429/120 |
| 2018/0034011 A1 * | 2/2018 | Tsuda | H01M 10/44 |
| 2018/0294454 A1 * | 10/2018 | Mackenzie | H01M 10/0436 |

FOREIGN PATENT DOCUMENTS

| | | |
|---|---|---|
| DE | 202009007677 U1 | 9/2009 |
| GB | 1329836 A | 9/1973 |
| RU | 2012123280 A | 12/2013 |
| SU | 458922 A1 | 1/1975 |
| WO | 2006048072 A1 | 5/2006 |
| WO | 2006082463 A1 | 8/2006 |

* cited by examiner

BATTERY STATE INDICATOR BASED ON RECOMBINATION DEVICE FEEDBACK

TECHNICAL FIELD

This disclosure relates to the control and operation of batteries.

BACKGROUND

A recombination device, as known in the art, may be used to limit the gas build-up and control internal pressure inside an electrochemical cell that generates hydrogen and oxygen during various stages of operation. This recombination device may facilitate the reaction of hydrogen and oxygen inside the cell to form water that will go back into the electrolyte solution, thus avoiding performance issues. The recombination device may allow for a sealed, relatively maintenance free cell with improved cycle performance.

SUMMARY

An aqueous battery system includes an electrode assembly, a recombination device, and a controller. The recombination device includes a catalyst that combines hydrogen and oxygen produced by the electrode assembly to form water and generate heat via exothermic reaction. The controller, responsive to a detected temperature or change in temperature associated with the recombination device due to the heat, changes power supplied to the electrode assembly.

A method for operating an aqueous battery includes detecting temperature or change in temperature associated with a catalyst configured to combine hydrogen and oxygen produced by an electrode assembly of the aqueous battery to form water and generate heat via exothermic reaction. The method also includes, responsive to the temperature or change in temperature, changing power supply to the electrode assembly.

An aqueous battery system includes an electrode assembly, a catalyst that combines hydrogen and oxygen produced by the electrode assembly to form water and generate heat via exothermic reaction, and a controller that, responsive to temperature or change in temperature associated with the catalyst due to the heat, changes power supply to the electrode assembly.

DETAILED DESCRIPTION

Figure 1:
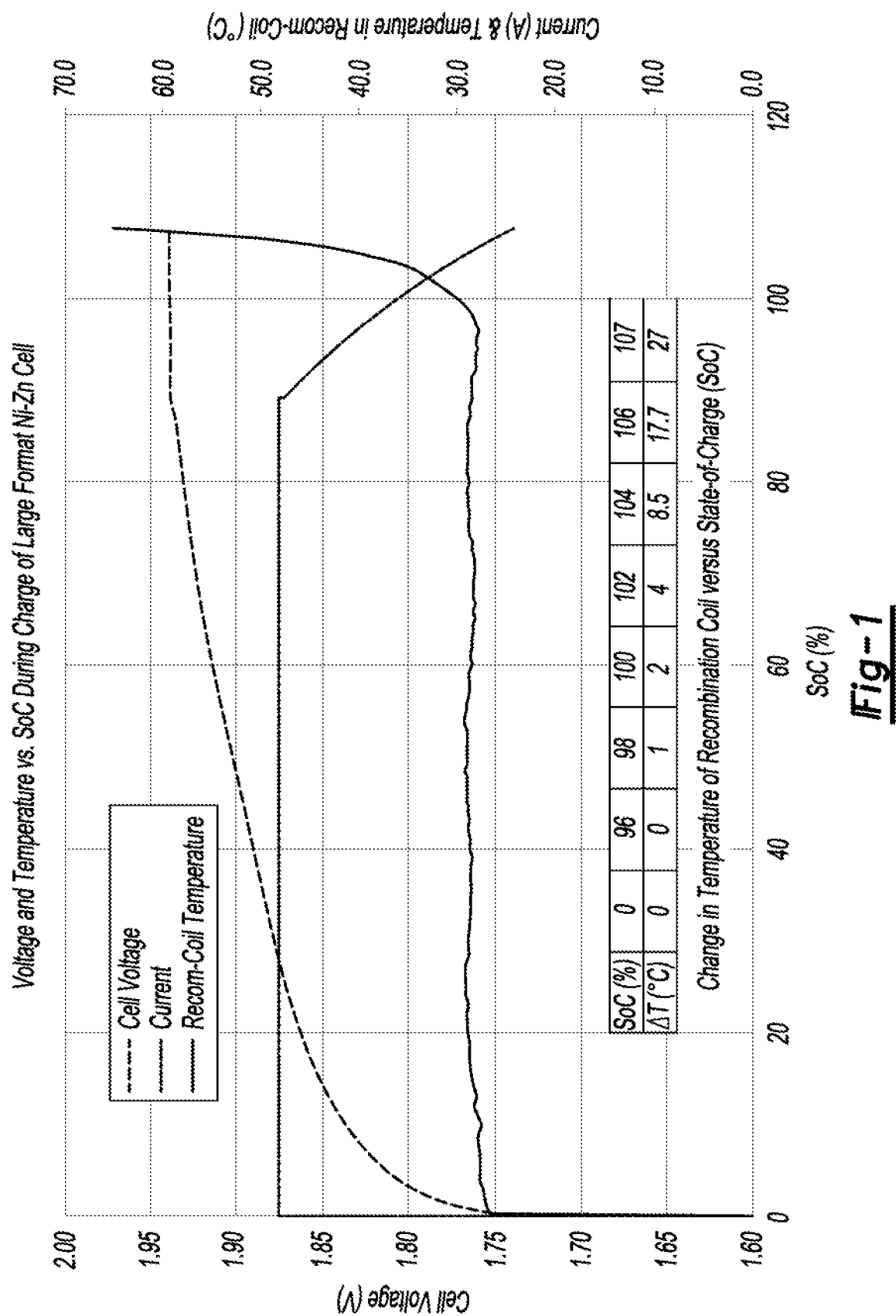
FIG. 1 is a plot of cell voltage, current, and recombination coil temperature versus state-of-charge.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Several types of electrochemical cells may naturally generate gas during various phases of the normal operating charge and discharge cycle. This is typical in alkaline chemistries (e.g., nickel-cadmium, nickel-iron, nickel-zinc, and silver-zinc), but it is also ordinary for lead-acid chemistries. Gassing may be most significant during the latter stages of a charge cycle and as the cell reaches an overcharged state. Gassing may also take place when the cell is being over discharged.

The onset of gassing in a nickel-zinc battery during charging (and over-discharge) is a function of a number of factors. These factors include ambient temperature, battery state-of-charge (SoC), current, and instantaneous charge voltage. In addition, the age and cycle life of the cell have an impact. Also, environmental factors like temperature may influence gassing. It may thus be difficult to accurately assess when gassing starts based on parameters that change based on age, environment, and use.

Cells subject to gassing usually have a resealable vent built into the case or header of the cell that will allow any gas to escape if the gas pressure increases to a certain level. This will help alleviate high pressure conditions. Any loss of gas, however, may impact the performance of the electrochemical cell. If too much gas is released, it may lead to the dry out of the cell or other issues.

One common way of reducing the buildup of gas volume and gas pressure, and the subsequent potential loss of gas through the vent, is to include a recombination coil/device as part of the battery design. Major components of the gas will be hydrogen and oxygen. The recombination coil is designed with materials that will serve as catalysts for the reaction of hydrogen and oxygen and facilitate the recombination of these. The recombination device serves as a reaction site for water generation using the gasses made during the operation of the electrochemical cell. This water will return to the electrolyte and maintain the appropriate electrolyte level and molarity, thus upholding cell performance.

A recombination device may thus be designed and built with materials that serve as catalysts for the reaction of hydrogen and oxygen and facilitate the recombination of these as known in the art. One such catalyst is platinum, and a typical design may include platinum particles mixed with carbon that is coated and pressed into thin sheets. Strips of these sheets are placed inside folded porous metallic (nickel) foam pieces that are typically attached to an internal cell component, such as a terminal, to facilitate heat transfer. The nickel foam is typically coated with a hydrophobic material, such as polytetrafluoroethylene (PTFE). The carbon-platinum mix in the recombination device serves as a reaction site for water generation, using the hydrogen and oxygen made during the operation of the electrochemical cell. The PTFE coated nickel foam will expel water from the catalyst and free up the reaction sites in the catalyst to repeatedly serve as reaction sites. The water will return to the electrolyte and maintain the appropriate electrolyte level and molarity, thus upholding cell performance.

Selectively overcharging a nickel-zinc battery may be useful to enhance and optimize cycle life. Too much overcharge, however, may increase the amount of gassing to the point where the cell will vent, and electrolyte may be lost. It may also result in alpha/gamma formation in the cathode and mechanical issues. The recombination device may not be able to keep up, resulting in eventual dry out or capacity fade. Similarly, too little overcharge may lead to insufficient energy being returned to the cathode to maintain the necessary amount of capacity to sustain cycling levels.

The chemical reaction between hydrogen and oxygen is exothermic. The recombination device will therefore experience a temperature increase. The greater amount of gas being generated by the cell, the higher the reaction rate of oxygen and hydrogen, the greater the temperature increase of the coil. This correlation between gassing rate and temperature increase is leveraged herein.

By having a temperature sensor (thermocouple, thermistor, etc.) attached to the recombination device for example, an indirect measurement can be made of how much gas is being generated. The greater the amount of gas, the more heat exothermic reactions generate. This establishes a strong correlation between gas generation and temperature increase. Furthermore, the amount of gas generated by either of the electrodes is indicative of what SoC the cell is currently at and the degree of overcharge taking place, if any. Thus, the temperature measurement can be used as a SoC indicator. This is shown in FIG. 1 where the cell voltage and recombination coil temperature are plotted versus SoC for a typical charge cycle of a nickel-zinc cell. As the SoC approaches 100% there is a rapid increase in gas generation and the recombination coil starts to generate heat. Beyond 100% SoC the temperature increase is exponential, as the cell is in overcharge mode and gas is being generated at an accelerated rate.

Table 1 shows the change in temperature of the recombination device as a result of gassing. If an overcharge to 104% SoC is desired, such a table can be used to indicate that charging should be stopped when the change in temperature of the recombination coil exceeds 8.5° C. It can also be used to indicate any over discharge and reversal of the cell, since this scenario also tends to generate gas. In a deep discharge scenario, a temperature sensor can be used to prevent over discharge of the cell. If this data is combined with cell voltage during cycling, the combination of voltage and recombination temperature will indicate the state-of-health (SoH) of the cell and give a measure of how much useful life is left in the cell.

TABLE 1

Example relationship between temperature of recombination coil and SoC.

| SoC (%) | 0 | 96 | 9 | 100 | 102 | 104 | 106 | 107 |
|---|---|---|---|---|---|---|---|---|
| $\Delta T$ (° C.) | 0 | 0 | 1 | 2 | 4 | 8.5 | 17.7 | 27 |

The voltage of a cell during charge will have a distinct profile and gradually rise with increased SoC. As the cell ages, the onset of gassing will start to gradually occur earlier during the charge cycle as a result of changes in the electrodes. Thus, during the life of the cell it will start to gas at a slightly lower voltage during each charge cycle. An observed increase in recombination temperature, driven by the onset of gassing, and the reading of the cell voltage at the time of this temperature increase, can be used to give a measure of the SoH of the cell. The lower the voltage is at the time the temperature starts to increase, the closer the cell is to its end of life.

During charging at higher rates, the voltage will typically reach an upper user-prescribed limit as it approaches 100% SoC and it will finish the charge in a constant voltage mode. During this phase, the charge current will gradually decrease. This can be seen in the voltage profile shown in FIG. 1. When gassing occurs during this constant voltage charge, it is the observation of the charge current combined with the increase in recombination temperature that will give a measure of the SoH. The higher the current is at the time the temperature starts to increase, the earlier in the charge cycle the onset of gassing occurs, and the closer the cell is to its end of life. An example of this relationship can be seen in Table 2.

TABLE 1

Example relationship between charge current, temperature of recombination coil, and SoH.

| SoH (%) | 100 | 90 | 80 | 70 | 60 | 50 |
|---|---|---|---|---|---|---|
| $\Delta T$ (° C.) | 2 | 2 | 2 | 2 | 2 | 2 |
| I (Amps) | 5 | 6 | 7 | 9 | 12 | 15 |

The recombination device can be attached to the positive terminal. This will allow for the heat generated in the recombination device to be transferred to the positive terminal, and the temperature increase to be measured on the outside of the cell by attaching a thermal sensor to the terminal. The recombination device can also be attached to the negative terminal, or to any other internal component of the cell (e.g., internal cell surface) that will facilitate heat transfer to any outside location on the cell from which temperature can be measured.

Thus, a battery such as nickel-iron or nickel-zinc containing a recombination device connected to one of the terminals will have a change in temperature on the terminal directly related to the overcharge of the battery. As hydrogen and oxygen are released during the last 1-10% of the charging operation for example, up to and above 100% SoC, the recombination device will start to recombine the gases into water and release heat. Once a significant change in temperature is detected, by use of a thermal sensor on or near the terminal, the charge operation will end, thus preventing overcharge of the battery. An example of how this is applied to a relatively large format battery subjected to a 2 to 3-hour charge rate is to stop any charging of the battery when the terminal temperature increases to 50-60° C. Another approach using the thermal sensor is to stop charging if the temperature increase at the terminal over the span of 1 minute exceeds 10° C.

This approach to charge management may significantly increase the cycle life of the battery. Termination of charge due to temperature, instead of voltage or current, may be more accurate per cell and per battery. The optimum voltage and current parameters for charge termination may change over the life of a battery. The onset of gassing during charge may be a more reliable indicator for SoC, even as the battery ages.

Figure 2:
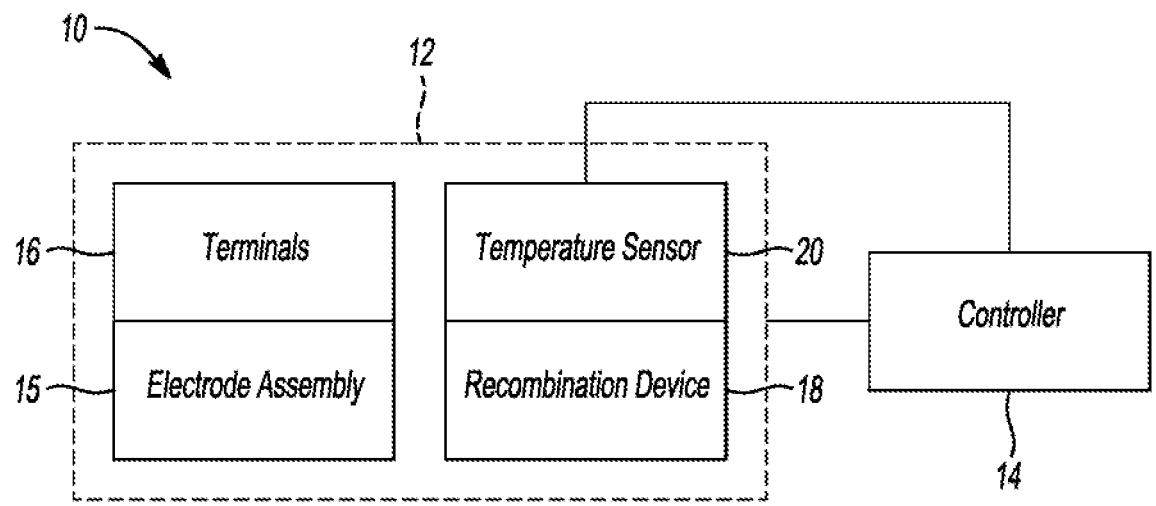
FIG. 2 is a block diagram of a battery system.

Referring to FIG. 2, a battery system 10 includes an aqueous battery 12 and a controller 14. The aqueous battery 12, among other things, includes an electrode assembly 15, terminals 16 extending therefrom, a recombination device 18, and a temperature sensor 20 operatively arranged with the recombination device 20. In other examples, the recombination device 18 may be attached with one of the terminals 16 such that the one of the terminals 16 is in thermal communication with the recombination device 18. That is, heat generated by the recombination device 18 is transferred to the one of the terminals 16. The temperature sensor 20 as such may be attached to the one of the terminals 16 (outside any housing) instead of the recombination device 18.

The controller 14 is in communication with the temperature sensor 20 via a wired network for example, and may control the aqueous battery 12 responsive to data therefrom.

Figure 3:
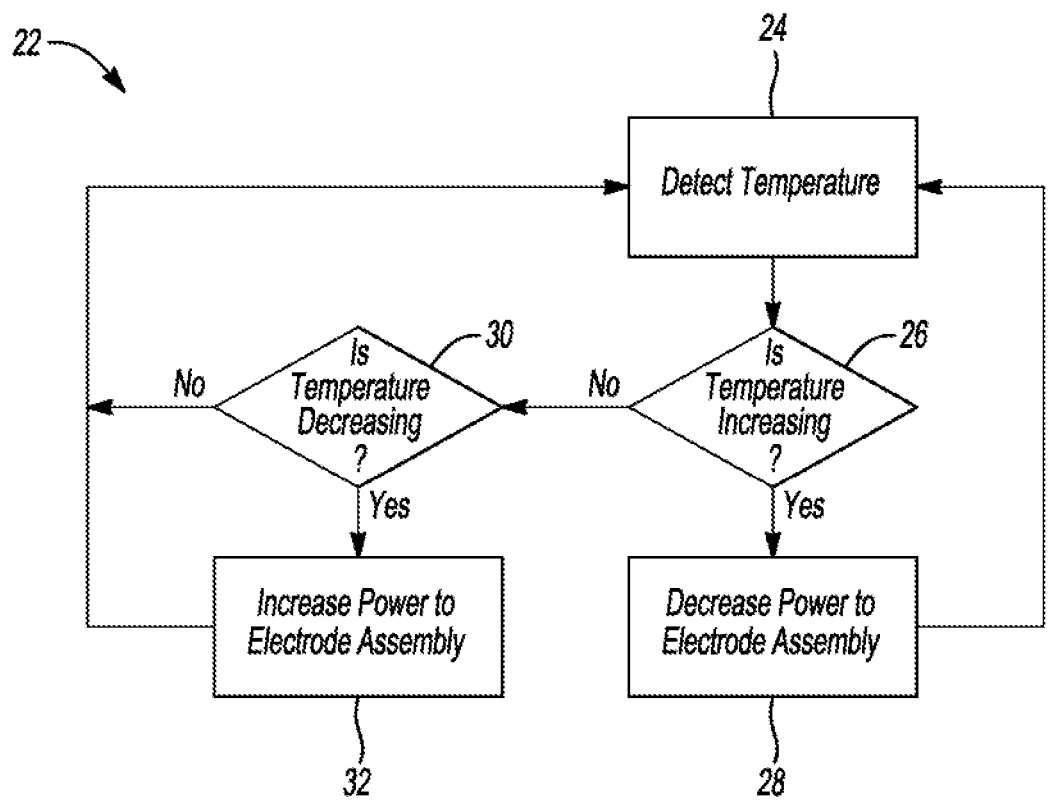
FIGS. 3-5 are flow charts of algorithms for controlling the battery system of FIG. 2.

Referring to FIGS. 2 and 3, the controller 14 may implement strategy 22 for controlling aqueous battery 12. At operation 24, temperature associated with the recombination device 18 is detected. A determination is made at operation 26 whether the temperature is increasing. If yes, power to the electrode assembly 15 is decreased at operation 28, and the strategy returns to operation 24. If no, a determination is made at operation 30 whether the temperature is decreasing. If yes, power to the electrode assembly 15 is increased at operation 32, and the strategy returns to operation 24. If no, the strategy returns to operation 24.

Figure 4:
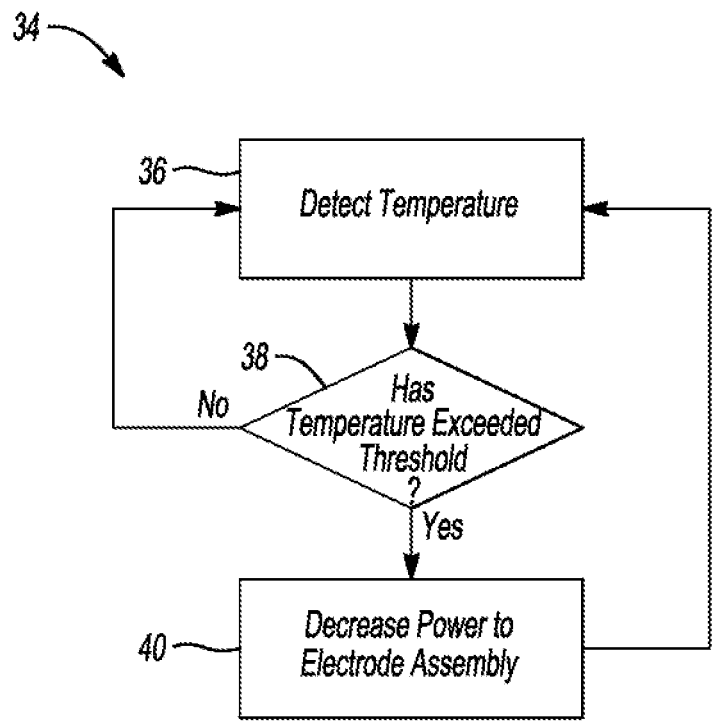

Referring to FIGS. 2 and 4, the controller 14 may implement strategy 34 for controlling aqueous battery 12. At operation 36, temperature associated with the recombination device 18 is detected. A determination is made at operation 38 whether the temperature has exceeded a threshold. If yes, power to the electrode assembly 15 is decreased at operation 40, and the strategy returns to operation 36. Returning to operation 38, if no, the strategy returns to operation 36.

Figure 5:
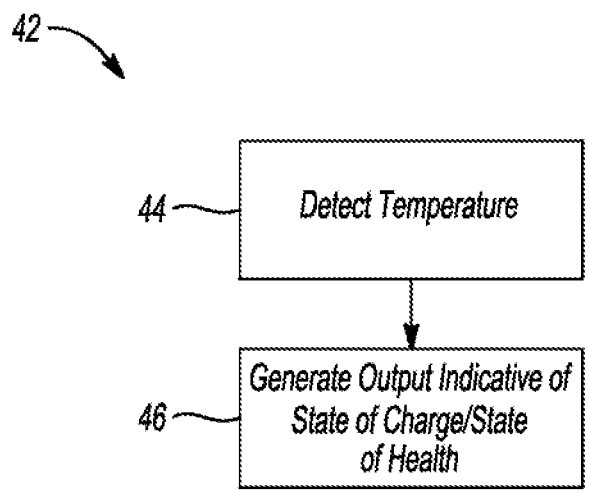

Referring to FIGS. 2 and 5, the controller 14 may implement strategy 42 for controlling aqueous battery 12. At operation 44, temperature associated with the recombination device 18 is detected. At operation 46, output indicative of the SoC and/or the SoH of the aqueous battery 12 is output.

Control logic or functions performed by controllers are represented by flow charts or similar diagrams in the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An aqueous alkaline battery system comprising:
   a housing containing an electrolyte, an electrode assembly in the electrolyte, a positive terminal and a negative terminal each extending from the electrode assembly to outside the housing, and a recombination device directly contacting one of the terminals, and including a catalyst configured to combine hydrogen and oxygen produced by the electrode assembly to form water and generate heat via exothermic reaction such that the heat conducts to the one of the terminals;
   a temperature sensor directly contacting the one of the terminals such that the heat from the one of the terminals directly conducts to the temperature sensor to detect a temperature of the one of the terminals; and
   a controller programmed to,
      responsive to the temperature or change in the temperature associated with the recombination device due to the heat, change power supplied to the electrode assembly, and
      indicate state of charge of the electrode assembly based on the temperature or change in temperature.

2. The aqueous alkaline battery system of claim 1, wherein changing the power supplied to the electrode assembly includes decreasing the power to the electrode responsive to the change in temperature increasing.

3. The aqueous alkaline battery system of claim 1, wherein changing the power supplied to the electrode assembly includes increasing the power to the electrode responsive to the change in temperature decreasing.

4. The aqueous alkaline battery system of claim 1, wherein changing the power supplied to the electrode assembly includes decreasing the power to the electrode responsive to the temperature exceeding a predefined value.

5. The aqueous alkaline battery system of claim 1, wherein the controller is further programmed to indicate state of health based on the temperature or change in temperature.

6. The aqueous alkaline battery system of claim 1, wherein the temperature sensor is directly attached to the one of the terminals outside the housing.

7. The aqueous alkaline battery system of claim 1, wherein the temperature sensor is a thermocouple.

8. The aqueous alkaline battery system of claim 1, wherein the temperature sensor is a thermistor.

9. An aqueous alkaline battery system comprising:
a housing containing an electrolyte, an electrode assembly in the electrolyte, a positive terminal and a negative terminal each extending from the electrode assembly to outside the housing, and a recombination device directly contacting one of the terminals, and including a catalyst configured to combine hydrogen and oxygen produced by the electrode assembly to form water and generate heat via exothermic reaction such that the heat conducts to the one of the terminals;
a temperature sensor directly contacting the one of the terminals such that the heat from the one of the terminals directly conducts to the temperature sensor to detect a temperature of the one of the terminals; and
a controller programmed to indicate state of charge of the electrode assembly based on the temperature or change in temperature.

10. The aqueous alkaline battery system of claim 9, wherein the temperature sensor is directly attached to the one of the terminals outside the housing.

11. The aqueous alkaline battery system of claim 9, wherein the temperature sensor is a thermocouple.

12. The aqueous alkaline battery system of claim 9, wherein the temperature sensor is a thermistor.

13. An aqueous alkaline battery system comprising:
a housing containing an electrolyte, an electrode assembly in the electrolyte, a positive terminal and a negative terminal each extending from the electrode assembly to outside the housing, and a recombination device directly contacting one of the terminals, and including a catalyst configured to combine hydrogen and oxygen produced by the electrode assembly to form water and generate heat via exothermic reaction such that the heat conducts to the one of the terminals;
a temperature sensor directly contacting the one of the terminals such that the heat from the one of the terminals directly conducts to the temperature sensor to detect a temperature of the one of the terminals; and
a controller programmed to indicate state of health of the electrode assembly based on the temperature or change in temperature.

14. The aqueous alkaline battery system of claim 13, wherein the temperature sensor is directly attached to the one of the terminals outside the housing.

15. The aqueous alkaline battery system of claim 13, wherein the temperature sensor is a thermocouple.

16. The aqueous alkaline battery system of claim 13, wherein the temperature sensor is a thermistor.

* * * * *